United States Patent [19]

Gernot

[11] Patent Number: 4,961,145
[45] Date of Patent: Oct. 2, 1990

[54] VEHICLE BRAKE SYSTEM WITH ANTI-LOCKING DEVICE FOR THE WHEELS AND RETARDER WITH MONITORED ACTUATION

[75] Inventor: Philippe Gernot, Puteaux, France

[73] Assignee: Labiavia - S.G.E., France

[21] Appl. No.: 298,996

[22] Filed: Jan. 19, 1989

[30] Foreign Application Priority Data

Jan. 22, 1988 [FR] France .............................. 88 00715

[51] Int. Cl.⁵ .............................................. B60T 8/00
[52] U.S. Cl. .................................. 364/426.02; 303/95
[58] Field of Search ....................... 364/426.01–426.03; 303/7, 95, 100; 180/197

[56] References Cited

U.S. PATENT DOCUMENTS

| | | | |
|---|---|---|---|
| 4,700,304 | 10/1987 | Byrne et al. | 364/426.02 |
| 4,848,852 | 7/1989 | Inove et al. | 303/100 |
| 4,861,115 | 8/1989 | Peterson | 303/15 |

Primary Examiner—Thomas G. Black
Attorney, Agent, or Firm—Larson and Taylor

[57] ABSTRACT

A vehicle brake system incorporating an anti-locking device for the wheels and a retarder (4) with monitored actuation of the type wherein actuation of the retarder is prohibited at least from the moment a request for regulation is sent to the anti-locking device (5) for the wheels. The system also includes an arrangement for re-enabling the restarting of the retarder adapted to provide re-enabling of this restarting only from the moment a new request for braking is made.

16 Claims, 6 Drawing Sheets

VEHICLE BRAKE SYSTEM WITH ANTI-LOCKING DEVICE FOR THE WHEELS AND RETARDER WITH MONITORED ACTUATION

BACKGROUND OF THE INVENTION

The present invention relates to a vehicle brake system incorporating an anti-locking device for the wheels and a retarder with monitored actuation, of the type comprising first means prohibiting the actuation of the retarder at least from the moment a regulation request is sent to said anti-locking device of the wheels.

It should first be reminded that retarders are devices adapted for slowing down the vehicle before and during the effective action of the brakes, via a manual or foot/pedal control actuated by the vehicle driver. The electromagnetic retarders, commonly in use, comprise a number n of independent switching ways, each one of them providing part of the deceleration torque. Such a type of retarder can be actuated or controlled via gradually preadjusted pressure switches (hydraulic or pneumatic ones), inserted in the braking circuit, or via switches integrated or not in the brake pedal block, successively acting depending on the depth of actuation or down travel of said pedal and thus providing the control or actuation, position by position, and under certain enabling conditions, of the n positions of the retarder operation. Provision can also be made for the switching of one or several ways of the retarder for each triggering of the pressure switch or cutout switch.

This being said, the purpose of the first aforesaid means is of course to prohibit the operation of the retarder when the anti-locking device of the wheels detects a skidding condition deemed as critical. As a matter of fact, if the retarder (with manual and/or foot actuation) would continue its action at that time, the risk of skidding of the wheels would be increased, thereby interfering with the action of said device.

For the anti-locking devices to be able to perform this known monitoring function of the retarder, they are provided with a so-called "regulation" terminal from which the desired piece of information can be picked up.

These devices also incorporate a so-called "alarm" terminal which controls a failure signalling light located on the dashboard of the vehicle, and from which the retarder can also be monitored and its actuation inhibited in case of failure of the anti-locking device of the wheels. It can be understood, in fact, that if this device has not operated or if it operates in a defective way, the operation of the retarder must be prevented in order not to further increase the risk of skidding of the vehicle wheels.

It is known still, in the brake systems of the type under consideration, to used a speed information, originating for example from an electronical tachograph or from a minitachogenerator attached to the gearbox in order to inhibit the actuation of the retarder when the vehicle is running at low speed (speed lower than a determined threshold) or at standstill. Since the electromagnetic retarder drains current, this avoids actuating it unnecessarily.

To sum it up, it can be seen that in the known brake systems—and as may also be the case in a brake system according to the present invention—the operation of the retarder may be prohibited:

in the case of a regulation request received by the anti-locking device of the wheels;

in the case of a failure of this device; and when the vehicle is at standstill or running at low speed.

The present invention is concerned with the conditions required for re-enabling the actuation of the retarder subsequent to its prohibited operation, especially when it follows upon a regulation request received by the anti-locking device of the wheels.

In the systems known, this re-enabling function is obtained immediately following a request for regulation sent from the anti-locking device of the wheels, whereby the resetting into operation of the retarder, however, is enabled only gradually, position by position (way by way or by groups of ways), with each time a controlled time-delay between two successive positions, this with a view to avoiding too rapid a resetting of the retarder.

The drawback of this known solution is that it results in having a greater instability of the anti-locking device of the wheels. Actually, the fact that the retarder may be effective again almost immediately upon the completion of the anti-locking regulation may bring about, under conditions of poor road grip or in the case of a slightly loaded vehicle, a skidding condition sufficient to trigger again said device before the end of the braking action. In other words, even when proper care is taken for a gradual and time-delayed resetting or re-starting of the retarder by foot or manual control, the anti-locking device of the wheels may, under some circumstances connected with the coating of the road or with the vehicle, be disturbed by the restarting of the retarder during the braking action.

SUMMARY OF THE INVENTION

The object of the present invention is to preclude the drawbacks of the prior art.

To this end, a braking system of the general type defined initially will be in accordance with the present invention, essentially characterized in that it includes means for re-enabling the resetting or restarting of the retarder adapted for re-enabling this resetting only from the moment a new request for braking is made.

To achieve this, it will be sufficient to have available one piece of information "braking" in addition to one or several pieces of information from the aforesaid known systems (information on the regulating operation of the anti-locking device or on its failure; tachometric information).

This piece of information "braking" may be supplied for example by the first hydraulic or pneumatic pressure switch (calibrated to a lower pressure), of a bank or ramp of pressure switches set up in the hydraulic or pneumatic circuitry of the braking circuit or still by the first cutout switch (the first one to close) of a ramp of cutout switches associated with a brake pedal.

The first pressure switch or cutout switch will therefore supply the required braking information and the following information will enable the actuation of the various positions of operation of the retarder to be triggered.

A more simple solution with a view to obtaining the required braking piece of information whilst precluding the use of a ramp of pressure switches or cutout switches, might consist in using the pressure switch or signal lamp of the stoplights, or also a switch actuated by the brake pedal, which would prove less costly. In this case, there can furthermore be provided for simultaneously controlling several positions of the retarder.

As can already be seen from the foregoing description, the invention more particularly relates to the conditions for re-enabling the actuation or control of the retarder after a prohibition taking place at least from the moment a request for regulation is sent to said anti-locking device of the wheels.

This re-enabling can of course be obtained under the same conditions, following a prohibition originating from other causes, in particular from a failure of the anti-locking device of the wheels or still from the fact that the speed of the vehicle has decreased below a predetermined value, this in a manner known per se.

A system according to the invention may thus be further characterized in that it includes second means for prohibiting the actuation of the retarder in the case of a failure of the anti-locking device of the wheels and/or in that it includes third means prohibiting the actuation of the retarder when the speed of the vehicle has decreased below a predetermined value.

It is also well understood that in a system according to the invention, the known arrangement may still be implemented according to which said means for re-enabling the restarting of the retarder are disposed so as to re-enable this restarting only gradually, position by position, each time with a given time-delay between two successive positions.

The advantageous arrangements of the present invention can thus be combined with the ones of the prior art.

BRIEF DESCRIPTION OF THE DRAWINGS

The invention will be best understood from the following description given by way of example only, with reference to the figures of the enclosed drawing, in which.

DETAILED DESCRIPTION OF THE INVENTION

Figure 1:
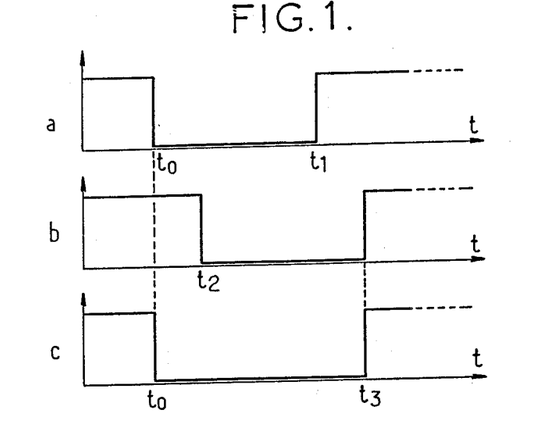
FIG. 1 is a simplified explanatory timing diagram.

FIG. 1 shows:

In (a) the piece of regulating information from the anti-locking device of the wheels depending on time t, whereby the normal operation (no regulation) is represented by positive strobes and a request for regulation is represented by level 0;

In (b) the piece of information for braking, a request for braking being represented by the positive strobes and the absence of braking by level 0;

In (c) a foot actuated control of the retarder, the enabling function for this actuation being represented by the positive strobes and its prohibition by level 0.

As can be seen in FIG. 1, the regulation of the anti-locking device begins at $t_0$, after a certain braking time and ends at $t_1$. At this very time $t_0$, the foot actuation control of the retarder becomes prohibited. With the prior art systems, this actuation of the retarder is re-enabled at $t_1$, that is upon completion of the regulation request of the anti-locking device of the wheels. According to the essential characteristics of the invention, this re-enabling only takes place at $t_3$, upon a new request for braking (whereby the interruption of the first braking took place at $t_2$).

Figure 2:
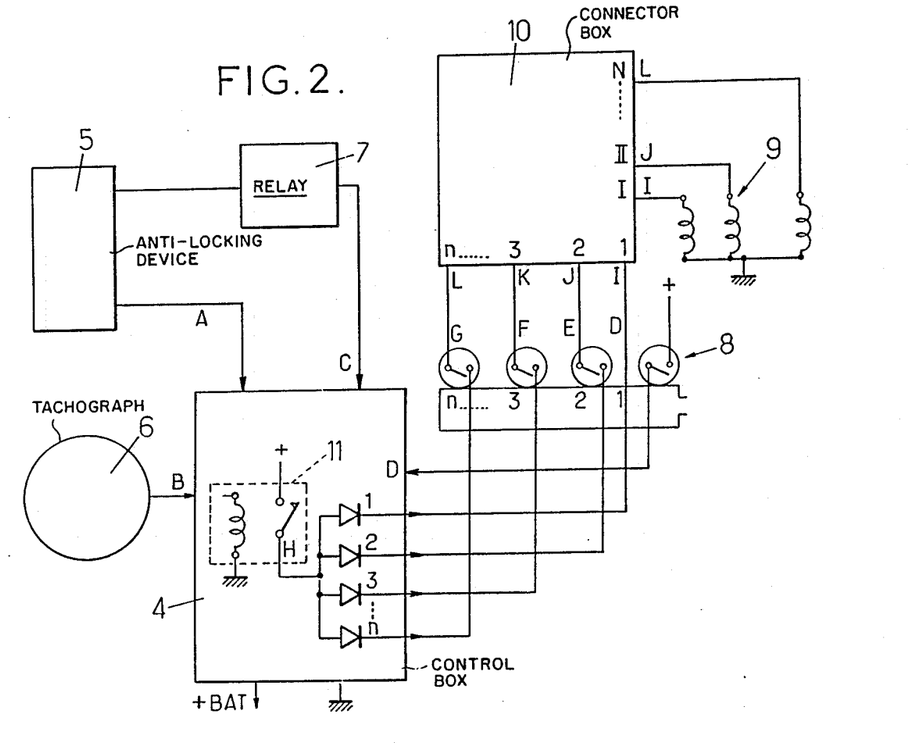
FIG. 2 is a simplified example of the circuits pertaining to such a system.

In FIG. 2 the following references can be seen:

In 4 a foot actuated control box of the retarder in a brake system according to the invention, whereby this control box receives the information supplied by an anti-locking device 5 for the wheels and a piece of information B on speed, supplied by an electronical tachograph 6. The anti-locking device 5 can provide the control box 4 either with a piece of information for regulation C, via a regulation relay 7, or a piece of information for alarm A; and In 8 a ramp with pressure switches referenced 1, 2, 3 ... n is associated with the braking circuit and is connected with the different windings of a retarder 9 via a connector box 10.

The first pressure switch 1 supplies a piece of information D for braking, to control box 4.

Thereupon, when this control box 4 enables the foot actuated control in H, there takes place a switching of the electromagnetic or static output relay 11 and the diodes 1, 2, 3 ... n then lead the positive terminal of the electric supply: directly to position 1 of the retarder which is then controlled to its first position I; and to the pressure switches 2 ... n which, when the pressure resulting from the pressing of the brake pedal is sufficient, switch the positive terminal of the electric supply in order to energize the connector box 10, thus performing the control of the retarder, position by position, to the other positions J ... L.

Figure 3:
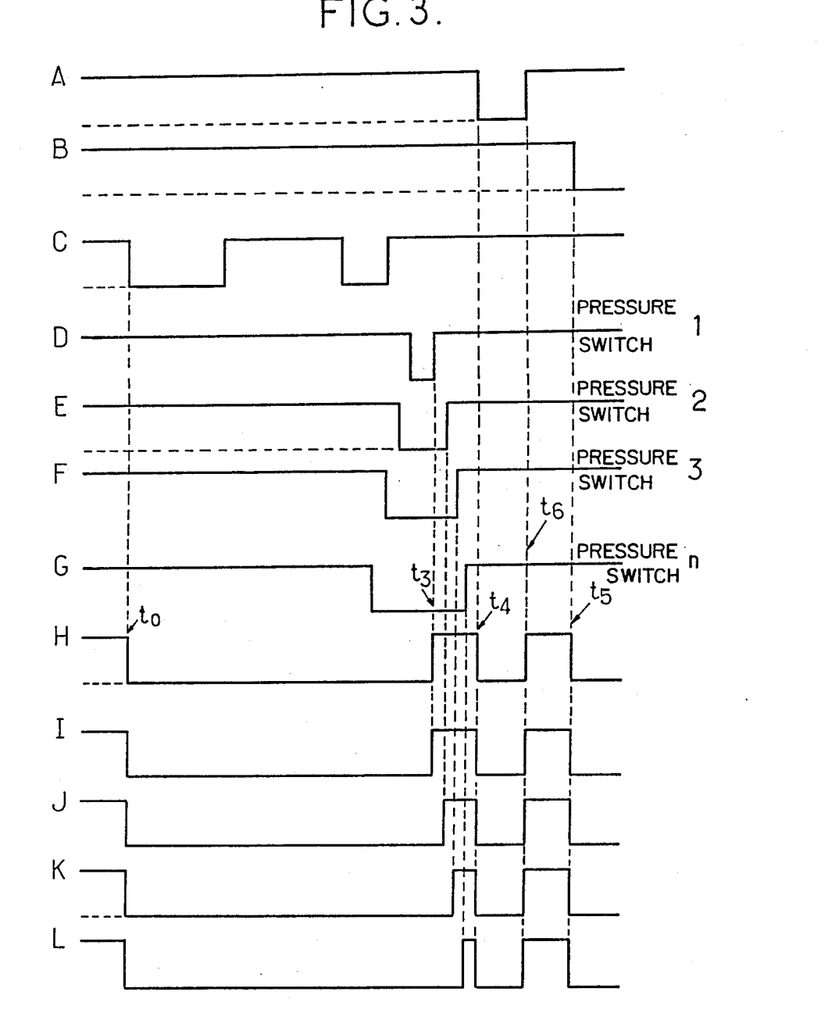
FIG. 3 is a functional timing diagram showing the operation of the circuits of FIG. 2.

In FIG. 3, the same alphabetic markings A to L have been used as in FIG. 2 in order to designate the same connections:

In A the alarm signal of the anti-locking device 5 for the wheels; the alarm is represented by the lower level of the signal;

In B the signal of low speed or standstill, whereby the low level of this signal reflects the standstill or a speed lower than the low speed threshold;

In C the regulation signal of the anti-locking device, whereby a regulation request is represented by the low level of this signal;

In D, E, F, G the level of the pressure switches 1 for braking information, and 2 to n for the actuation of the retarding level; the high level represents the pressure switches in a triggered position, and the lower level shows their opening;

In H the enabling signal from the foot actuated control of the retarder, whereby the low level represents the prohibition of this foot actuated control.

As can be seen on this part of the diagram, the prohibition of the foot actuated control of the retarder takes place at $t_0$, as soon as the request for regulation of the anti-locking device of the wheels (diagram C) comes up, and only ends at $t_3$, upon a new request for braking (diagram D). It can also be seen here that the prohibition of the foot actuated control of the retarder can take place at $t_4$ in case of alarm on the anti-locking device of the wheels (diagram A), or also at $t_5$, in case of a speed lower than the low speed threshold (diagram B). At $t_6$, it can be seen that the end of the alarm signal A re-enables the foot actuated control of the retarder.

In I to L, the control levels, respectively 1, 2, 3 and N of the retarder. These diagrams show the correlation between the triggering of the pressure switches 1 to n (diagrams D to G) and the respective control levels of the retarder.

Figure 4:
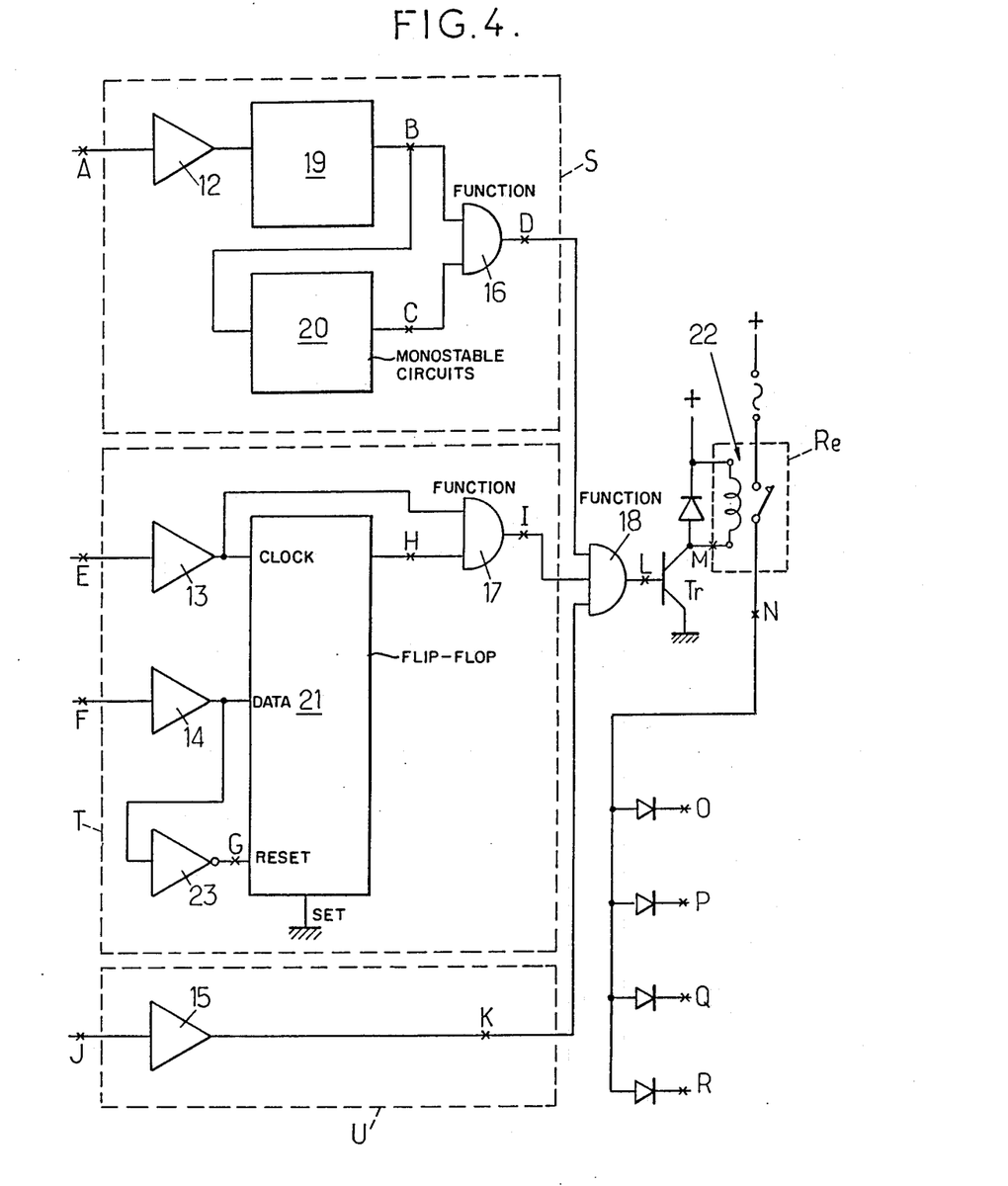
FIG. 4 is a functional block diagram of the electronic module of a system according to the invention.

FIG. 4 shows a functional block diagram of the electronic module of a system according to the invention. In this figure, the letters A to R do not correspond to the letters used in the FIGS. 2 and 3:

A designates the speed information;
E the braking information;
F the regulation information of the anti-locking device of the wheels;
J the alarm information of this device; when the input points are disconnected, for safety purposes, the various points A, E, F, J are applied to a low status in order to make the various functions involved inoperative;
O, P, Q, R designate the diode outputs towards the foot actuated control of the retarder;
References 12 to 15 designate signal shaping circuits;
References 16 to 18 designate AND-circuits;
References 19 and 20 designate restorable, monostable circuits;
Reference 21 designates a data circuit of the flip-flop type;
Reference 22 designates a switching relay;
Reference 23 designates an inverter.

The various functions ensured by this module are shown schematically by a block or module designated S ensuring the cutout function at low speed, T ensuring the regulation function of the retarder, and U ensuring the safety function.

I. Low Speed Cutout Function

The low speed cutout function can be used with the output stage represented in FIG. 4, whereby the regulating functions of the retarder and safety are excluded. A low speed cutout module is thus obtained.

The type of data processing used in the low speed cutout function features an interesting novelty. Actually, the different low speed cutouts available on the market utilize a principle of integration and/or monostable (restorable) circuit using the speed information. At low speed (below the cutout speed threshold) the drawback of these devices is that they tend to generate small pulses at the pulse rate of the speed information, which enables the actuation of the retarder for short time periods and results in unwanted unsmooth actuations (untimely enabled triggering of the retarder; wear-out by untimely switching of the relay at the output stage of the low speed cutout function).

The speed information A originating from a minigenerator or from a tachograph is a piece of pulsed information whose period T of pulses is associated with the speed of a vehicle (for example 4 pulses/meter run).

Figure 5:
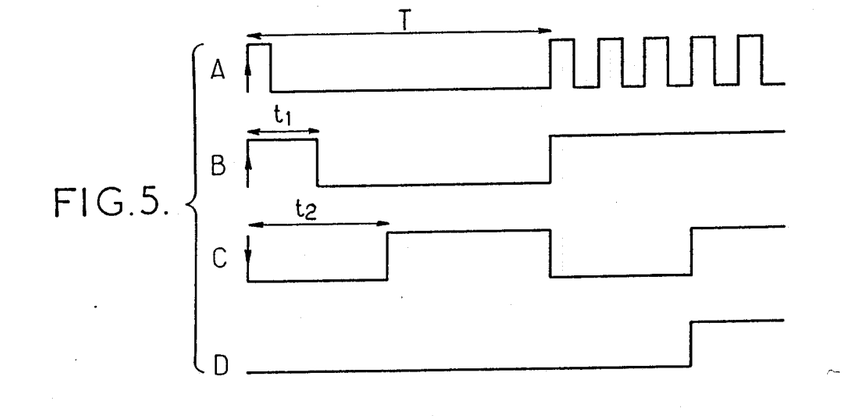
FIGS. 5 to 9 are timing diagrams for various functions.

Each pulse of the speed information in A triggers, on its rise edge, the monostable circuit 19 which creates a pulse of a duration $t_1$ of positive level in B. The monostable 19 creates on its rise edge the triggering of monostable 20 which creates a pulse of duration $t_2$ of negative level in C. Then, a logical "and" function is carried out by gate 16 between the information in B and in C. When these two pieces of information are at a high level, a piece of information of high level will be available at D. If at least one of the two pieces of information in B or in C are at a low level, a low level will be available at output D (see FIG. 5).

Two cases of operation can be encountered:

$T > t_1$ i.e. $T > t_2$ with $t_1 < t_2$ i.e. $t_1 < T < t_2$ or $T < t_1$ $t_1$ is used for determining the low speed cutout threshold.

1st case: $T > t_1$
If $T > t_2$ with $t_1 < t_2$:
On each rise edge in A, the monostable 19 will, only once, release a pulse of duration $t_1$ thus generating on its rise edge the triggering of monostable 20.

Monostable 20 will, only once, release a pulse of duration $t_2$ (negative pulse).

Figure 6:
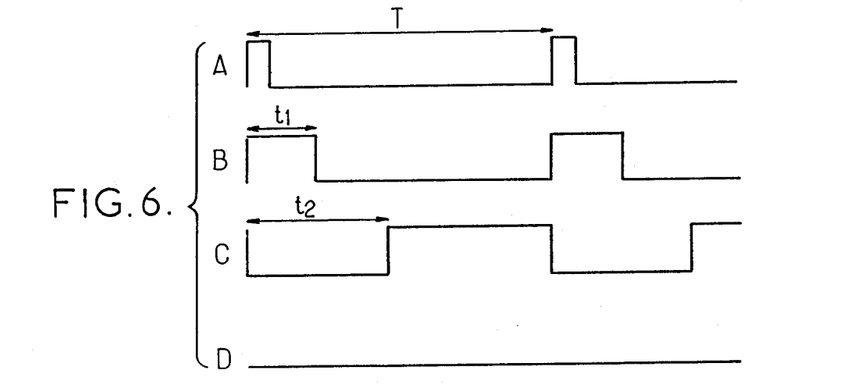

The two signals B and C are never at high level at the same time. Consequently, the signal in D is permanently at a low state which corresponds to the low speed cutout (see FIG. 6).

If $t_1 < T < t_2$:
On each rise edge in A, the monostable 19 release, only once, a pulse of duration $t_1$, whereas monostable 20 triggers at all times T (at each rise edge in B), thereby ensuring a permanent low level.

Figure 7:
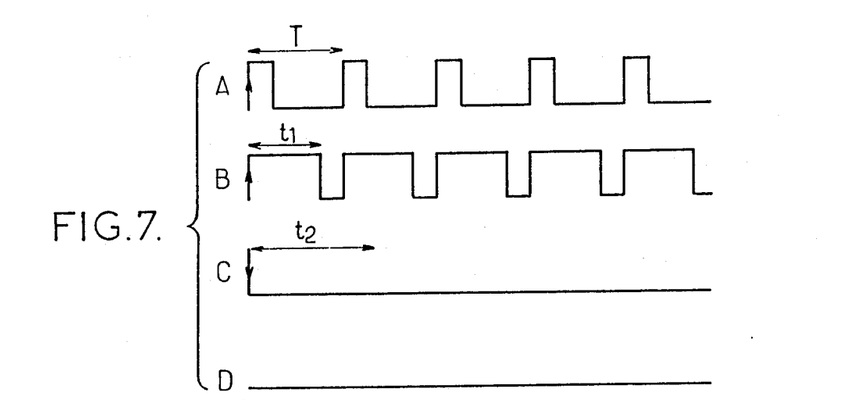

Consequently, the signal in D is permanently at low state which corresponds to a low speed cutout (FIG. 7).

As a conclusion, if $T > t_1$, the signal in D is at a low state corresponding to the so-called low speed cutout state.

Figure 8:
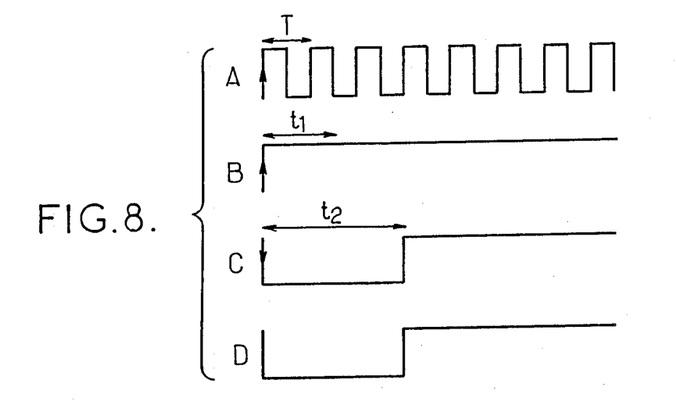

2nd case: $T < t_1$
On each rise edge in A, the monostable 19 triggers again every T seconds, thus ensuring a permanent high level; the monostable 20 triggers on the rise edge of the signal in B, ensuring a low level signal for a time $t_2$ (see FIG. 8).

Consequently, the signal in D after a time $t_2$ switches over to the high state which corresponds to the so-called "no cutout" state (the speed of the vehicle is then higher than the cutout speed threshold).

As a conclusion, if $T < t_1$, the signal in D is at the high state (after a time $t_2$) corresponding to the so-called "no-cutout" state (the speed of the vehicle is then higher than the speed threshold of the cutout function at low speed).

II. Retarder Regulating Function

The braking information E issued for example from the first pressure switch of a ramp incorporating pressure switches inserted in the pneumatic or hydraulic braking circuit, is used as a clock for the data "flip-flop"-type function 21.

On a rise edge of clock E, the state (high or low) of data F is memorized in H. As soon as data F drops to a low state, corresponding to a regulating request from the anti-locking device of the wheels, the reset in G switches over to a high state (the piece of information G is converse to information F). To this high state of the reset G corresponds in output H a low state which lasts till the next rise edge of clock E where the cycle is resumed.

Figure 9:
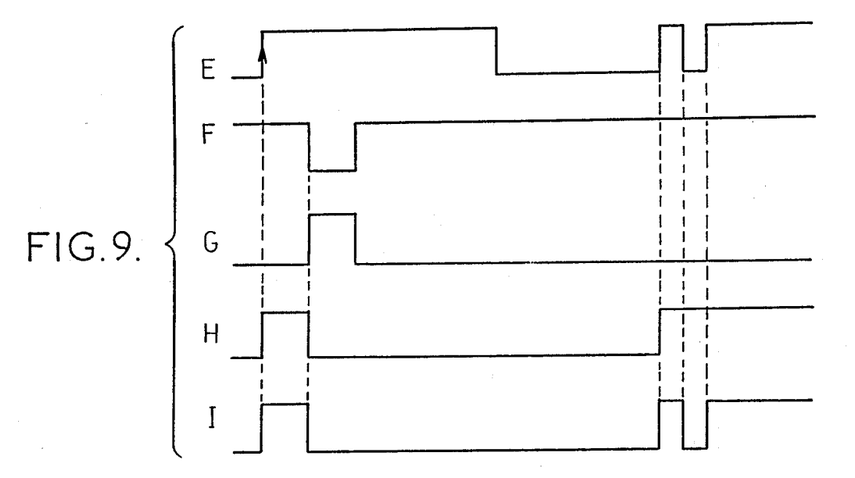

The set function is permanently at a low level in order to make it inoperative. If, and only if, the two signals in E and in H are at the high state, the signal in I is at high state, thus enabling the actuation of the retarder (see FIG. 9).

As a conclusion, the actuation of the retarder becomes operative if there is a request for braking in E and if there is no request for regulation from the anti-locking device of the wheels in F.

If there is a request for regulation from the anti-locking device of the wheels in F, the actuation of the retarder is neutralized in I during the request for regulation in F and beyond, until the next request for braking in E.

III. The Safety Function

When there is no failure on the anti-locking device of the wheels, the alarm information of this device is at high level in K (see FIG. 4).

As long as there is no alarm from the anti-locking device of the wheels, the safety function enables the operation of the retarder.

VI. The Output Switching Function

If all of the three points D, I, K issued from the low speed cutout functions, retarder regulation and safety are at a high state, the point L is then at a high state (logical function L=D & I & K). In the other cases, the point L is at low state.

If L is at a high state (low state), the output transistor Tr switches over to M at low state (high state), thus urging the closing (opening) of relay Re which switches (does not switch) in N the positive current of the battery supply (see FIG. 4).

The four points 0, P, Q, R, of the outputs then supply (do not supply) the four sensors of the foot actuated control (ramp with pressure switches or cutout switches associated with the braking circuit) with the positive current of the battery supply.

The main advantages of the invention are as follows:

The operation is safer since the braking distance is optimized in the skidding phase, because of the neutralization of the retarder action until the end of the braking action.

A better compatibility is obtained with the anti-locking device for the wheels, since from the moment a regulation request is made from this device, the foot actuated control of the retarder is prohibited at least until the end of the braking action; there is therefore no risk of repeatedly triggering the anti-locking device during a braking action.

The invention makes it possible to reduce the costs components and wiring for the "foot actuated control" function compared with the prior art technology.

Finally, the invention makes it possible to increase the reliability of the system, because of the simpleness of the functions as well as of the use of a common switching way, at the output of the new function of foot actuated control, intented for the supply of the pressure switches of the ramp instead of using several independent switching ways at the output of the existing foot actuated control function, in order to energize the relays of the connector box.

The foregoing description explained by way of example that the "braking" information and the request for activation of the various positions of the retarder were obtained by pressure switches or cutout switches integrated in the braking system (see page 4, lines 9 to 21).

However, the implementation of a different acquisition mode of the braking request ca be contemplated, while maintaining the same principles as regards the "low speed cutout" function, the "retarder regulation" function and the "safety" function as described above with reference to FIG. 4.

One can in fact use a piece of analogical information "braking" and build up from the latter the different thresholds of request for action from the retarder.

In particular, it is possible to use a pressure sensor supplying a voltage or a current proportional to the pressure prevailing in the pneumatical or hydraulic circuit of the braking circuit or also a potentiometer or inductive device supplying a voltage or a current proportional to the down travel of the brake pedal. This latter device can be integrated or not in the braking pedal block. Thus, one can obtain a device supplying a piece of analogical information on voltage or current commensurate with the down travel of the brake pedal over an angle range located before and during the actual rise of the pressure in the braking circuit.

Figure 10:
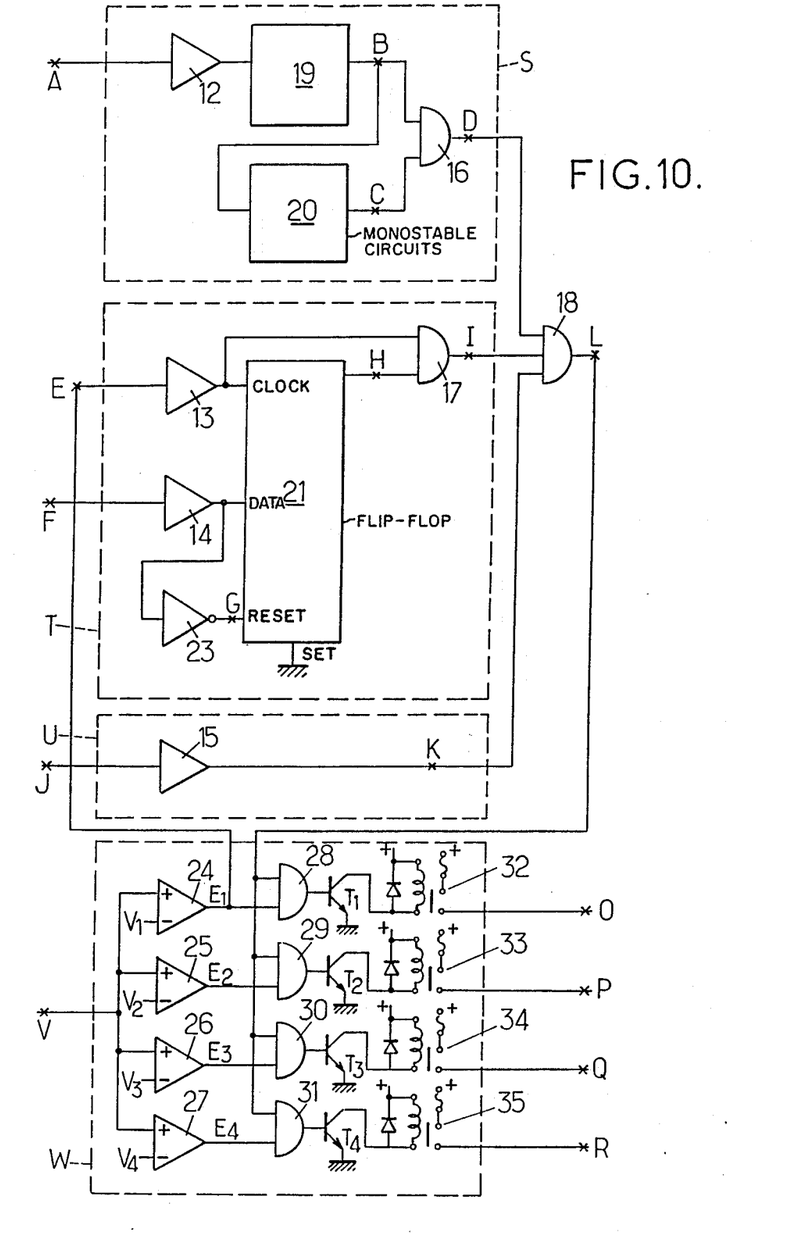
FIG. 10 is an alternative of the block diagram of FIG. 4.

An example of such an application is represented in FIG. 10 in which the modules S, T, and U respectively representing the functions "cutout at low speed or at standstill", "retarder regulation" and "safety" functions are identical to the ones of FIG. 4.

In this FIG. 10, the additional module W picks up in V the piece of analogical information representative of the braking action and through an electronical circuitry with thresholds (comparators, operational amplifiers . . . 24, 25, 26, 27) detects the various request thresholds for retarder action.

Thus, if the voltage in V is superior to the voltage V1, E1 is then at the high state, causing the braking information E to switch over to the high state.

If voltage V is superior to voltages V1, V2, V3, V4, then E1, E2, E3, E4, respectively, switch over to the high state, thereby meaning the presence of a request for the actuation of the retarder successively on positions 1, 2, 3, 4.

This request is validated only if the logical "AND" gate 18 is at the high state at output L, thereby bringing about via the AND-gates 28, 29, 30, 31, and the transistors T1, T2, T3, T4 the switching over of the relays 32, 33, 34, 35 corresponding to the respective points 0, P, Q, R.

The output points of the device are directly connected with the connector box ensuring the power switching of the various retarder ways.

Whether the braking information is directly incremental or supplied under the analogical form, it will be appreciated that the number of positions of the retarder is non-limiting and in particular, is not limited to four. The retarder actuations can equally be grouped together or not, time-delayed or not for restarting, namely after a regulating action of the anti-locking device of the wheels as already explained hereabove.

What is claimed is:

1. A vehicle brake system including an anti-locking device for the wheels of the vehicle and a retarder for, when actuated, slowing down the vehicle, said system further comprising means for prohibiting actuation of the retarder at least from the moment that a regulation request is transmitted to said anti-locking device, and means for re-starting the retarder and for providing re-enabling of said re-starting only from the moment that a new braking request is transmitted, said system further including a braking circuit including a bank of pressure switches incorporated therein and control means for providing that a braking related signal is picked up by a first switch of said bank of switches so as to enable the restarting of said retarder and that signals supplied by other pressure switches of said bank of switches are used for triggering actuation of various positions of operation of the retarder.

2. A system according to claim 1 wherein said braking related signal is also picked up by a cutoff switch actuated by a brake pedal of the vehicle.

3. A system according to claim 1 wherein said braking related signal comprises an analog signal.

4. A system according to claim 3 wherein said braking signal is generated by a pressure signal for supplying a voltage or current proportional to the pressure prevailing in the braking circuit.

5. A system according to claim 3 wherein said braking related signal is generated by a potentiometer of an inductive device supplying a voltage or current proportional to the degree to which the brake pedal of the vehicle is depressed.

6. A system according to claim 1 further comprising second means for prohibiting actuation of said retarder responsive to a failure of said anti-locking device.

7. A system according to claim 6 further comprising third means for prohibiting actuation of the retarder when the speed of the vehicle drops below a predetermined value.

8. A system according to claim 1 wherein said means for enabling re-starting of the retarder comprises means for enabling said re-starting gradually, position by position, with a predetermined time delay between each success we position.

9. A system according to claim 1 wherein said means for enabling re-starting of the retarder comprises means for enabling said-restarting gradually, position by position, with a predetermined time delay between each successive position.

10. A vehicle brake system including an anti-locking device for the wheels of the vehicle and a retarder for, when actuated, slowing down the vehicle, said system further comprising means for prohibiting actuation of the retarder at least from the moment that a regulation request is transmitted to said anti-locking device, and means for re-starting of the retarder and for providing re-enabling of said re-starting only from the moment that a new braking request is transmitted, said system comprising a bank of cutout switches associated with a brake pedal of the vehicle and control means for providing that a braking related signal is picked up by a first switch of said bank of switches so as to enable the re-starting of said retarder and that signals supplied by other switches of said bank of switches are used for triggering actuation of various positions of operation of the retarder.

11. A system according to claim 10 wherein said system includes a braking circuit and said braking related signal is also picked up by a pressure switch of a bank of pressure switches incorporated in the braking circuit.

12. A system according to claim 10 wherein said braking related signal comprises an analog signal.

13. A system according to claim 12 wherein said braking related signal is generated by a pressure signal for supplying a voltage or current proportional to the pressure prevailing in the braking circuit.

14. A system according to claim 13 wherein said braking related signal is generated by a potentiometer or an inductive device supplying a voltage or current proportional to the degree of depression of the brake pedal of the vehicle.

15. A system according to claim 10 further comprising second means for prohibiting actuation of said retarder responsive to a failure of said anti-locking device.

16. A system according to claim 15 further comprising third means for prohibiting actuation of the retarder when the speed of the vehicle drops below a predetermined value.

* * * * *